2,754,273
Patented July 10, 1956

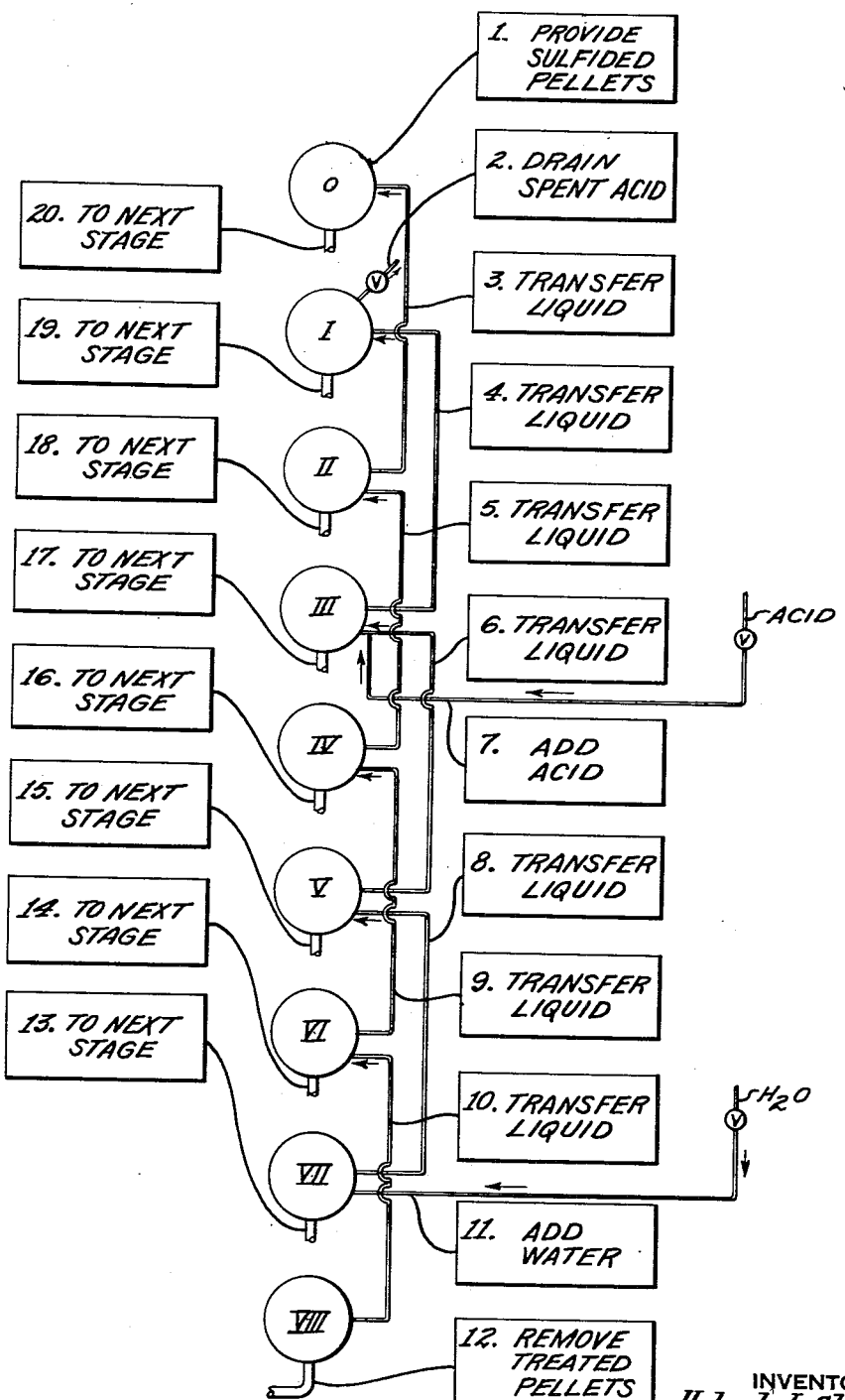

2,754,273

METHOD OF LEACHING IRON SULFIDE FROM CLAYS AND MINERALS

Hubert A. Shabaker, Media, Pa., assignor to Houdry Process Corporation, Wilmington, Del., a corporation of Delaware Application May 29, 1952, Serial No. 290,634

2 Claims. (Cl. 252—450)

The present invention relates to systems and methods for contacting granular solids with treating liquids and is chiefly concerned with the acid leaching and washing of minerals to remove undesired components or impurities therefrom. The invention is particularly directed to leaching and washing of clays and especially of sulfided iron-containing clays to remove the iron sulfide and other acid-solublized impurities therefrom.

The preparation of modified clay catalysts of superior properties is described in previous patents including for example U. S. patents numbered 2,466,048 and 2,466,052, which describe processes wherein iron-containing clay is sulfided at selected elevated temperature and thereafter subjected to acid treatment for removal of the iron thus freed by the sulfiding operation. Together with the iron there may also be thus removed a greater or less quantity of other minor constituents present in the clay such as magnesium, calcium, alkali metal, etc. To obtain the greatest improvement in catalytic and other properties the conditions of acid leaching must be controlled to effect substantially complete removal of the iron sulfide without breaking down or adversely affecting the clay structure and without detrimental dissolution of excessive quantities of alumina from the clay. It is highly important that the leaching and washing operations be efficiently carried out to remove essentially all of the iron that has been "freed" by the sulfiding operation, since the iron so "freed" is in a position to confer undesired and detrimental properties particularly when the modified clay is employed as a cracking catalyst.

Recognizing the importance of complete and efficient leaching and washing, an object of the present invention is to effect this purpose in a practical manner suitable for larger scale operation, and which is reliable as to substantial uniformity of results, while conserving the quantity of treating liquid required and maintaining low equipment costs.

These objects are achieved in accordance with the present invention by carrying out the acid leaching and subsequent water washing of the sulfided clay in a plurality of stages, wherein the clay is treated batchwise, with the acid and water being transferred successively from batch to batch in countercurrent manner so that the sulfided clay in its progress through the preselected stages of treatment is contacted in sequence with acid of successively higher purity and likewise thereafter with water of successively greater purity; the final material leaving the system in a highly purified state ready for subsequent drying. The initial wetting of pellets with acid and the exothermic reactions occurring particularly at the start of the acid leaching process release considerable heat, and since it has been found that for the production of modified clay of desired improved properties the temperature of the liquid treatment must be strictly limited, adequate provision is made in this operation to avoid detrimentally excessive increase in temperature.

The manner of practicing the invention will be understood from the description which follows read in connection with the accompanying drawing illustrating in a schematic diagram a preferred operating sequence.

In the usual case the sulfided clay will be in the form of molded cylindrical pellets such as the typical acid-activated clay pellets commercially available for use in fixed or compact moving bed catalytic cracking operations, a familiar example of which is that known as pelleted TCC Filtrol. The invention is equally applicable to the treatment of other types and shapes of clays and other minerals including for example granules having no regular pattern.

While other acids can be employed, such as sulfuric or nitric acid or certain of the more ionized organic acids, it has been found preferable to employ diluted hydrochloric acid for the leaching operation, such acid being used in dilute aqueous concentrations not exceeding about 25 weight per cent in any treating stage, and preferably in a concentration of about 15 weight per cent HCl. For acid leaching of sulfided Filtrol pellets or other clays having an iron content in the order of about 1–3% iron expressed as $Fe_2O_3$, the acid leaching operation is best effected over a period of at least 12 hours and preferably for 24 hours, with the subsequent water washing over a like period or until the wash water is substantially free of chloride.

When sulfided clay pellets of the type described are contacted with acid, heat in the amount of about 80 B. t. u. per pound of pellets is produced in the course of a period of about 2 hours, about ½ of such amount of heat being produced during the first half hour. Relatively negligible quantities of heat are produced during the second hour diminishing further during the third and fourth hours of acid leaching. It is highly important that this heat be removed during the operation so that the temperature does not rise above about 90° F. especially during the earlier stages of the leaching. A temperature level in the order of about 80° F. is more desirable for the leaching as well as for the washing operation and temperatures going below 50–60° F. should be avoided for more than short periods of time since such lower temperatures hinder effective iron removal. The heat evolved during the intial contact of the clay with acid must accordingly be removed in some suitable manner. This may be accomplished for instance by circulating the acid used in that step through external cooling means. The acid supplied to the first leaching step should ordinarily be below room temperature at the time that the sulfided pellets are initially contacted therewith; for instance if the pellets are furnished at about room temperature the acid may be precooled to a temperature of below about 50° F. The behaviour of the acid leaching solution with changes in temperature cannot be fully explained on a theoretical basis, but from what has been observed experimentally, it can be stated that at the low temperature of initial impregnation described enough acid enters into the interior of the pellets before substantial reaction has taken place. As a result of the heats of wetting, solution and reaction, the observed rise to the described moderate temperature occurs which is best effective for the dissolution of the iron, but does not attain such higher temperatures at which fairly rapid or extensive attack of the alumina would occur. At these higher temperatures whether as a result of the diminution of acid strength from its attack on the alumina or other components, or concurrently therewith as a result of other simultaneous effects (including perhaps hydrolysis of the iron) the initially dissolved iron apparently is blocked in the interior of the pellets or granules and becomes exceedingly difficult to leach.

In the accompanying drawings the sequence of operations performed are numbered successively for convenience from 1 to 20, and the stages of treatment for each successive batch of clay are indicated by Roman numerals from Roman numeral I through VIII. As illustrated, it is to be assumed that the operation is in progress and that the system is full, at equilibrium, and ready to start a cycle. Having brought up a batch of sulfided clay pellets (in stage 0) ready to have operations thereon begun (step 1) the immediately preceding batch which has already received the first stage of acid treatment (I) is drained (step 2) and the spent acid is discharged. If desired this acid may be purified and concentrated for subsequent use in the system at the point of fresh acid addition, as will be hereinafter described.

Having drained the acid from the pellets in stage I, the next operation (step 3) is to transfer liquid from the batch of pellets which have already received the second stage of treatment to the pellets entering the first stage of treatment; thus as shown the acid liquor from II is sent to 0. In like manner the liquid drained from each successive (higher numbered) stage is successively transferred to the pellets entering that stage, after the container has been emptied to receive its new supply of liquid. Thus, referring to the drawings, it will be seen that after emptying of liquid from I (step 2) and from II (step 3), the used acid from III is transferred to I (step 4) and the wash water discharged from IV is sent to II (step 5). Similarly the wash water from V is sent to III (step 6) to which fresh acid is added (step 7).

The tanks which previously contained the pellets treated in stages IV and V now being empty they are supplied with used wash water respectively from stages VI (step 8) and VII (step 9) and the now emptied tank from stage VI is also supplied with wash water from stage VIII (step 10), the emptied tank from stage VII being filled with fresh water from an external source (step 11). The pellets which have been thoroughly leached and washed in going through stages I to VIII having been drained (step 10), are set aside or sent to drying or other desired processing (step 12). The emptied container from which the pellets have been removed is now ready for receiving a new supply of sulfided pellets (step 1).

All of the tanks marked 0 through VII now having been filled with respective treating liquids the pellets therein are ready to undergo the next succeeding stage of their treatment, respectively. In each of the succeeding steps 13 to 20 each of these tanks figuratively is moved up in the stated order to the next treating stage as shown by the heavy arrows.

While the process can be carried out by physically moving the tanks or other treating vessels at the end of each stage of treatment of the pellets therein to the next succeeding stage, which may be practical in operating on smaller batches, for large scale operation, it will be understood, that it is generally more feasible to employ stationary tanks accomplishing the same purpose by appropriate valving arrangements operating manually or by automatic controls. In a typical system for treatment of sulfided commercial acid-activated clay containing about 1–3% iron sulfide, each stage of treatment may be timed for an equal predetermined period of 4–8 hours. With a six hour period for each stage of treatment and employing 8 tanks "on stream," the pellets are subjected to 24 hours acid treatment and 24 hours water washing. In the described operation the pellets discharged from treating stage VIII should be substantially free of water soluble chloride, otherwise the operation should be adjusted by increasing the number of water washing stages or otherwise extending the washing treatment. In general, the number of stages of washing should be increased if the washing ratio in the operation falls below about 3.0/1. Washing ratio is defined as the amount of wash water put into the system divided by the amount of water retained in the washed pellets discharged from the system.

It will be seen that in the batch countercurrent operation above described, 4 stages of acid leaching and 4 stages of water washing are provided for, wherein sulfided pellets enter one end of the system while fresh wash water enters the other end, and these advance in stepwise fashion in opposite directions to leave the system at opposite ends. Concentrated hydrochloric acid is introduced near the middle of the system, mixes with the wash water to required dilution and advances with it. At the end of each 6 hours, or such other interval that may be selected as required, the pellets and liquid advance one stage in their stepwise movement through the system. During these 6 hours or such other selected period the pellets and liquid in residence in each stage are thoroughly mixed in suitable manner to insure that equilibrium is reached by the end of the 6 hour period.

In initially starting up the system, hydrochloric acid of the required dilution, say 15% by weight hydrochloric acid in water, is placed in tanks shown in stages I, II, III and IV and fresh wash water is placed in the tanks shown in stages V, VI, VII and VIII, in approximately the volumes which will obtain when the system is at equilibrium. Then the sequence of operations above described is started and carried out through the designated time cycle.

Details as to equipment and instrumentation may vary widely depending upon the size of the operation and other factors; however, several requirements must be satisfied. Among these, mixing or good circulation of the liquid within each tank must be provided at frequent intervals. Temperatures within each tank or stage of treatment must not exceed 90° F. and should be preferably maintained in the range of about 70–80° F. Prevention of temperatures in excess of 90° F. is absolutely essential during the first stage of acid treatment in which the pellets are initially contacted with acid, and it is likewise very important that thorough and continuous mixing be maintained during that stage. A primary object of the mixing is to assure that localized temperatures in excess of 90° F. do not result. One practical way of controlling the temperature is by circulation of the acid through an external cooler to remove the exothermic heat of reaction evolved as well as the heat due to the wetting effect. With larger sized equipment it may be found desirable to add the catalyst to the initial acid treating stage over an extended period in the order of about one half hour.

In the following example, the approximate requirements of acid and water are given on the basis of treating clay pellets prepared by sulfiding an acid activated montmorillonite clay having an iron content in the order of about 1.5% $Fe_2O_3$. After equilibrium has been reached and the cycle of operations is in progress there is added at each six-hour period to the final washing tank of the series, 144 pounds of water per 100 pounds of the sulfided pellets and fresh acid is added to the middle of the system in the amount of about 71.5 pounds of 35% aqueous hydrochloric acid. Under these conditions of operation there is periodically removed from the system spent acid at the end of each 6-hour period containing approximately 142 pounds of water and 25 pounds of chloride (calculation as HCl), while the washed pellets leave the system containing approximately 48.4 pounds of sorbed and surface water. By dilution of the added concentrated fresh acid with the spent wash liquor from the preceding batch, which wash liquor contains acid leached from the pellets, the acid concentration during the acid leaching stages is brought to about 15% hydrochloric acid.

The spent acid liquor discharged from the system will contain impurities in the form of salts dissolved from the clay. This acid can be purified and concentrated for reuse in the system in lieu of fresh concentrated acid. This may be accomplished by adding concentrated sulfuric acid to the spent acid liquor and flashing off liquid from the mixture. Concentrated hydrochloric acid can then be recovered from the liquid by suitable fractionation.

A preferred procedure is to distill the dilute spent acid discharged from the system (step 2) to drive off water until a constant boiling aqueous mixture remains. Then there is added concentrated sulfuric acid in an amount at least theoretically sufficient to release all of the chloride from the salts, thereby increasing the concentration of HCl to a point in excess of that present in aqueous hydrochloric acid of constant boiling composition. By further distillation of the sulfuric (sulfate) containing mixture, hydrochloric acid of desired concentration can be recovered for return to the acid leaching system as concentrated acid.

It is desirable that the fresh acid added to the leaching system be at its highest practical concentration since in this manner the quantity of wash water can be maintained at a maximum while providing the required dilution of acid in the acid leaching steps.

Obviously many modifications and variations of the invention as hereinbefore set forth may be made without departing from the spirit and scope thereof and therefore only such limitations should be imposed as are indicated in the appended claims.

What is claimed is:

1. The method of removing iron sulfide from clays and minerals containing the same, which comprises subjecting such iron sulfide-containing material to successive batchwise liquid treatments including in order successive acid leaching and water washing stages wherein each batch of the material receives at least four acid leaches of not less than four hours duration each and at least four water washes each of the same duration as said acid leaches, adding fresh concentrated hydrochloric acid to the fourth acid leaching stage and supplying fresh wash water to the fourth water washing stage; transferring wash water and acid liquor respectively from each of said stages of liquid treatment to a preceding stage, the wash water from said first water washing stage being used to dilute the fresh concentrated acid supplied to said fourth acid leaching stage and being proportioned with respect to the fresh acid so as to provide in said fourth acid leaching stage dilute acid of approximately 15% hydrochloric acid concentration by weight; discharging each batch of material from the fourth water washing stage at one end of the system and discharging spent acid liquor from the other end of the system, maintaining the temperature throughout said acid leaching and water washing operations above 50° F. and below 90° F.; purifying and concentrating the spent acid discharged from the system and returning the thus concentrated acid to the fourth stage of acid treatment.

2. In the method of leaching sulfided iron-containing clay with mineral acid by successive batchwise operation in which the clay is subjected in stages to successive treatment with acid of increased purity and the used acid from treatment of a preceding batch is progressively utilized in leaching of a next succeeding batch, the step of controlling the temperature to within the range of from 50° to 90° F. during at least initial contact of the clay with acid by precooling said acid, thereby preventing the development of exothermic temperature of sufficient magnitude to cause substantial attack on the aluminaceous component of the clay.

References Cited in the file of this patent

UNITED STATES PATENTS

| | | |
|---|---|---|
| 1,796,799 | Manley et al. | Mar. 17, 1931 |
| 1,999,773 | McMichael | Apr. 30, 1935 |
| 2,343,462 | Laird et al. | Mar. 7, 1944 |
| 2,416,011 | Latchum | Feb. 18, 1947 |
| 2,466,046 | Shabaker et al. | Apr. 5, 1949 |
| 2,558,011 | Sprauer et al. | June 26, 1951 |